Figure 1:
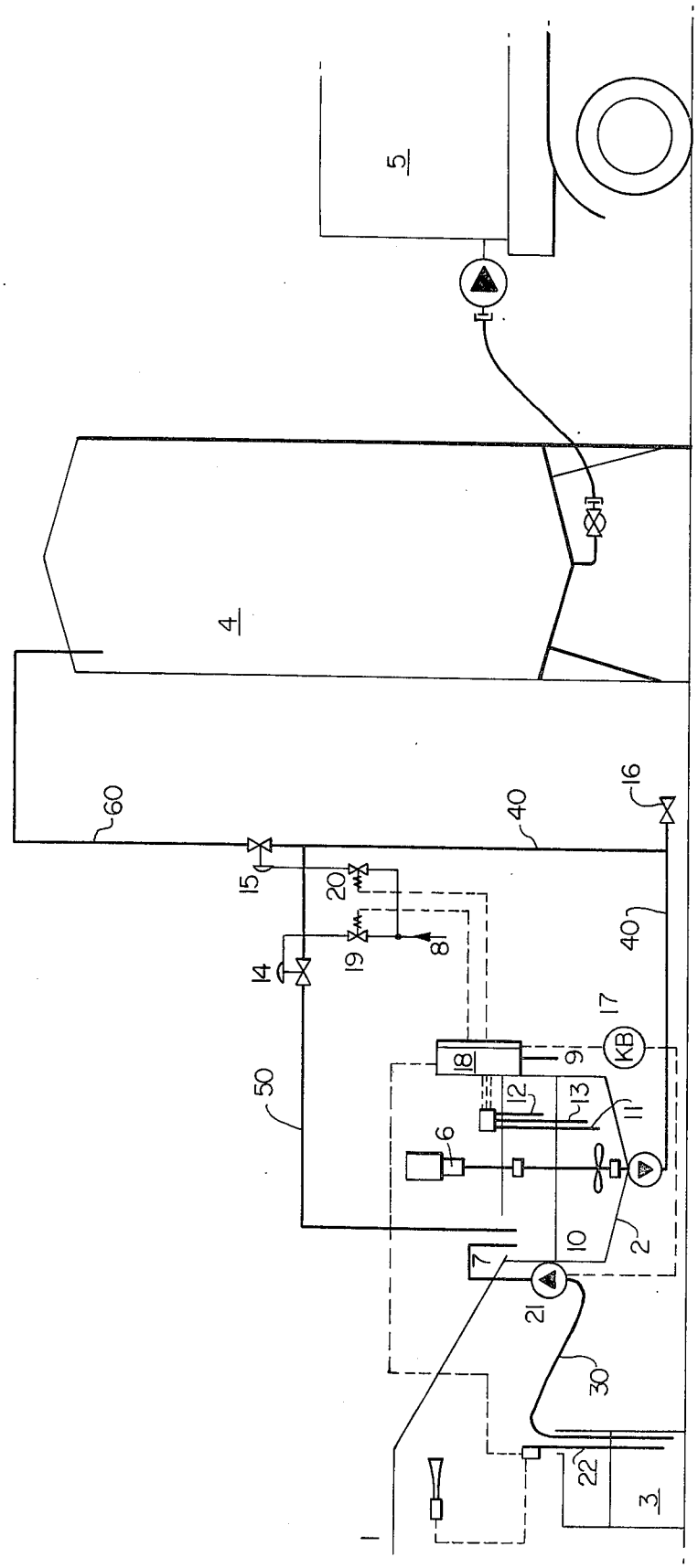

United States Patent [19]

Henningsen

[11] 4,120,656

[45] Oct. 17, 1978

[54] METHOD AND APPARATUS FOR COLLECTING MUCOSA

[75] Inventor: Bent Aage Henningsen, Holte, Denmark

[73] Assignee: Novo Industri A/S, Bagsvaerd, Denmark

[21] Appl. No.: 780,753

[22] Filed: Mar. 24, 1977

[51] Int. Cl.² .......................... A22B 5/00; A61L 1/00; A61L 3/00

[52] U.S. Cl. ...................................... 422/28; 17/1 R; 17/51; 137/391; 422/32; 422/106; 422/292

[58] Field of Search ................. 21/58, 61, 77; 17/1 R, 17/43, 51; 137/3, 391, 572; 195/6; 424/183; 536/21

[56] References Cited

U.S. PATENT DOCUMENTS

| | | | |
|---|---|---|---|
| 3,337,410 | 8/1967 | Gross et al. | 21/58 |
| 3,605,783 | 9/1971 | Pecker et al. | 137/3 |
| 3,862,003 | 1/1975 | Okuyama et al. | 536/21 |
| 4,030,521 | 6/1977 | Karlsson | 137/3 |

*Primary Examiner*—Morris O. Wolk
*Assistant Examiner*—Bradley Garris
*Attorney, Agent, or Firm*—Fidelman, Wolffe & Waldron

[57] ABSTRACT

A system for collecting and stabilizing pasty material such as for example the mucosa available from slaughterhouse operations, employing a collecting tank, a storage reservoir and a preservative reservoir, the collecting tank being equipped with upper and lower liquid level controls and means associated with the controls so that when the pasty material accumulates to the level of the upper level control the pasty material is discharged to the storage reservoir and when the pasty material level thereafter drops to the position of the lower liquid level control, discharge is halted and preservative is metered from the preservative reservoir into the collecting tank.

For cleaning out the collecting tank discharge can be continued until the collecting tank has been emptied. For startup a sensing element is provided at the bottom of the collecting tank to cause metering of preservative into the collecting tank when pasty material first enters the collecting tank.

7 Claims, 2 Drawing Figures

METHOD AND APPARATUS FOR COLLECTING MUCOSA

The present invention relates to an apparatus for and a method of collection and discontinuous discharge of a pasty material, for example intestinal mucosa.

In various industries, a pasty material which appears as a by-product or raw material and which is saved for later use needs to be treated with one or more additives, which may be solids or liquids. Often, the supply of the pasty material is irregular during the working day and, therefore, problems arise when it is desired to add the additive or the additives to the pasty material as soon as possible after the appearance thereof, particularly when the concentration of the additive or additives in the mixture should be kept within narrow limits.

The above situation typically prevails in connection with collection of intestinal mucosa during the course of slaughterhouse operations. Conveniently, a small collection tank employed to receive the mucosa is intermittantly emptied or discharged of its contents. For the sake of simplicity the invention will hereinafter be described predominantly in relation to a preferred apparatus for and a preferred method of collection and of discontinuous discharge of intenstinal mucosa, although the invention in its broadest sense encompasses an apparatus for and a method of collection and discontinuous discharge of any pasty material.

When the intestines or casings have been removed from animals in the slaughterhouse, they are cleaned in order to remove partially or totally digested food constituents. Then either the intestines are finely minced, thereby forming a pasty material, or the intestinal mucosa is removed from the intestines in order to prepare the intestines for their application as raw material for sausage skin. Thus, finely minced intestines or intestinal mucosa with a porridge-like consistency is available as a slaughterhouse by-product of value as a raw material for the production of heparin.

However, the supply of intestinal mucosa e.g. from the casing machine, is irregular during the working day in the slaughterhouse. Furthermore, a preservative should be added immediately to the released intestinal mucosa.

Prior collection units for intestinal mucosa comprised a small collection tank with a volume of around 200 liters equipped with agitating means. During the filling of the small collection tank, preservative was added manually to maintain the preservatve concentration at or above the required value. When the small collection tank was full, it was either transported directly to a heparin factory or it's contents were emptied into a large storage reservoir. When the storage reservoir was full, the contents thereof were transferred to a tanker lorry for transport of the intestinal mucosa to the heparin factory.

It is an object of the present invention to provide an apparatus for and a method of collection and discontinuous discharge of a pasty material, preferably intestinal mucosa, which apparatus and method is relatively cheap and which requires little attention from the operators (working in a slaughterhouse in the instance where the pasty material is intestinal mucosa), and which eliminates the manual addition of preservative (in the instance where the pasty material is intestinal mucosa). Transportation of the primary collection tank to the storage reservoir is avoided.

According to the apparatus aspect of the present invention there is provided a primary, relatively small tank, hereinafter called the collecting tank, for collection and discontinuous discharge of pasty material with an inlet, preferably near the top of the tank, for the pasty material, an outlet, preferably a bottom outlet, for the pasty material, rotatable agitator means inside the tank carried by a shaft and a transportation or discharge means at the outlet, which transportation means continuously conveys pasty material out of the collecting tank. The pasty material discharged by the transportation means can be either circulated back to the collecting tank or conveyed to a secondary, larger tank which serves as a storage reservoir. The rotatable agitator means and the transportation means are preferably carried on a common shaft.

Inside the collecting tank is an upper liquid level control, associated with actuating means which initiate transfer of pasty material from the collecting tank to the storage reservoir. Inside the collecting tank is a lower liquid level control associated with actuating means which halt transfer of pasty material to the storage reservoir and substitute circulation of the discharged pasty material back into the collecting tank, and which cause metering of a predetermined dosage of additive or additives into the collecting tank.

One preferred embodiment of apparatus according to the invention comprises a collecting tank in accordance with the first aspect of the present invention adapted to the collection thereunto and discontinuous discharge therefrom of intestinal mucosa (to a storage reservoir), together with a preservative reservoir from which metering means supply preservative to the small primary tank in proper dosage units.

Another preferred embodiment of apparatus according to the invention comprises a collecting tank in accordance with the first aspect of the present invention, wherein the bottom outlet connects to a conduit leading from the collecting tank to a branching point, whereat the conduit divides into two valved conduits, one leading back to the collecting tank and the other leading to a storage reservoir.

Another preferred embodiment of apparatus according to the invention comprises a collecting tank as above described and a preservative reservoir together with an alarm system, preferably an acoustic alarm system, which is activatable when the additive reservoir system is empty.

Preferably, the dosage means for the additive or the additives is a tube pump or tube pumps adapted to liquids.

According to the method aspect of the present invention there is provided a method of intermittant or continuous collection but discontinuous discharge of pasty material, which method comprises introducing pasty material into a collecting tank, wherein it is subjected to influence of rotating agitator means, recirculating and mixing the pasty material whenever the level of the pasty material is below a predetermined upper liquid level and then whenever the level of the pasty material reaches or exceeds the upper liquid level initiation of transfer of the pasty material to a storage reservoir, the transfer continuing until the level of the pasty material drops to a lower predetermined liquid level whereupon transfer is halted and metering an additive or additives into the collecting tank each time the quantity of the pasty material between the higher liquid level and the lower liquid level has been transferred to the storage reservoir.

Figure 2:
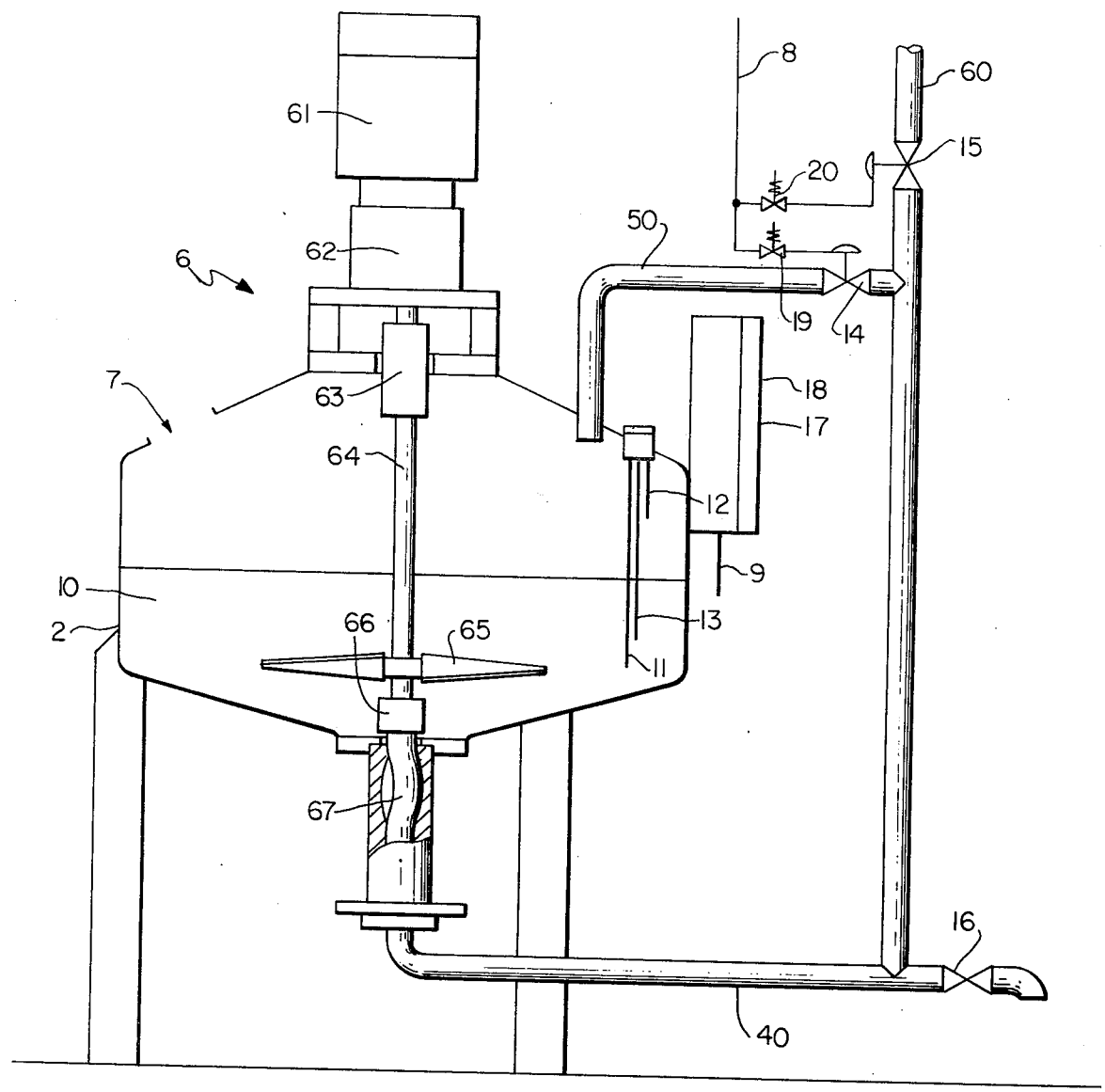

For a better understanding of the present invention and to illustrate practice thereof, reference will now be made, by way of example, to the accompanying drawings, in which FIG. 1 shows a schematic cross-sectional view of an apparatus in accordance with the present invention; and FIG. 2 shows a cross-sectional view of the collecting tank.

Referring now to FIGS. 1 and 2 of the drawing, it may be seen that the system includes a collecting tank 2, a preservative reservoir tank 3 and a storage reservoir tank 4. Also shown in part is a tanker lorry 5 (employed to remove the mucosa). The tanks are connected so preservative can be metered from preservative reservoir 3 through line 30 into collecting tank 2 and pasty material can be transferred from collecting tank 2 by way of conduits 40 and 60 into storage reservoir 4, or recirculated out of and back into collecting tank 2 by way of conduits 40 and 50. At start-up (i.e. when collecting tank 2 is empty) valve 14 is open and valve 15 is closed and only recirculation can occur.

In operation of collecting tank 2 the intestinal mucosa 10 slides from a casing machine outlet 1 to an inlet 7 of collecting tank 2. At start-up, a valve 14 is open and valve 15 is closed. When the level 10 of the intestinal mucosa in tank 2 first reaches bottom liquid level control 11, the liquid level control 11 signals control unit 18 which thereupon activates a rotatable agitator means 6 comprising an electric motor 61, a gearbox 62, an upper universal joint 63, a shaft 64, an agitator 65, a lower universal joint 66 and a transport means 67. Furthermore, dosage pump 21 is activated, whereby a metered amount of preservative from preservative tank 3 is delivered to collecting tank 2, an impulse from a time clock 17 started by control unit 18 determining the pumping time.

The liquid level control 11 is optional, but its presence facilitates initiation or start of operations, which usually is in the morning, and normally bottom level control 11 is used only at start-up during the course of a working day.

The intestinal mucosa is now circulating out the transportation means 67 through conduits 40 and 50 by way of the valve 14 then back to the tank 2. Placement of transport means 67 and agitator 65 on a common shaft is considered to be an advantageous feature of the apparatus. Only one motor drive is required, and, in addition, agitation and recirculation insures complete admixture of preservative with the pasty material.

Nothing happens when the level 10 of the intestinal mucosa rises past lower liquid level control 13, since lower liquid level control 13 is set to activate control unit 18 only when it is passed by the level of the intestinal mucosa in a downward direction.

When the level of the intestinal mucosa 10 in the collecting tank 2 reaches upper liquid level control 12, this level control signal activates control unit 18, whereupon valve 15 is opened and valve 14 is closed, by an impulse from the control unit 18 to air pressure supply valves 19 and 20 (utilizing the plant air pressure supply 8). Now transport means 67 acts to pump the intestinal mucosa 10 to storage reservoir 4, and the transfer continues until the liquid level of the intestinal mucosa drops to the level of the lower liquid level control 13, whereupon the signal from lower level control 13 causes control unit 18 to open valve 14 and close valve 15 through an impulse from the control unit 18 on the electric power supply 9 of the air pressure supply valves 19 and 20. Also, dosage pump 21 is started to deliver a metered amount of preservative from the preservative tank 3 to the collecting tank 2, again an impulse from time clock 17 controlling the pumping time for transferring preservative.

The electrical circuitry in control unit 18 and the detailed structure of the sensing units of level controls 11, 12, 13 adapted to start and to stop the equipment herein described are well known to the art, being available commercially in many alternative modes, and therefore will not be described herein.

Thus, most of the time the system requires no attention from an operator due to its fully automatic performance.

The only occasions where the system normally requires special attention are (1) at initiation or start-up, (2) upon draining of the intestinal mucosa at the end of a working day and (3) for cleaning of the apparatus. All three operations are easy to perform either manually or semi-automatically, as will now be explained in detail.

Start-up using the liquid level control 11 has been already described in connection with the normal performance of the apparatus. Of course control unit 18 would have switches so an operator can switch on the agitator and transport means 6 manually, and also send dosage pump 21 through a time clock cycle. Draining the collecting tank 2, at the end of a working day, can be performed manually through switches on the control unit 18. A special draining switch on the control unit 18 opens the valve 15 and closes the valve 14 regardless of the level of the intestinal mucosa 10 inside tank 2. The intestinal mucosa 10 inside collecting tank 2 is then pumped to the reservoir 4 until the level of the intestinal mucosa reaches the bottom liquid level control 11. The circuits inside control unit 18 ignore signals from lower level control 13 but use the signal from bottom control 11 to stop the rotatable agitator means 6 automatically stops, which halts, also, the pumping. By switching on the control unit 18, it is possible to then restart the rotatable agitator means 6 and pump any residual amount of the intestinal mucosa from the tank 2 to the reservoir 4, or out through drain valve 16.

Cleaning of the collecting tank 2 after draining has ended, can be performed as a so called cleaning-in-place (c-i-p) operation, i.e. a cleaning operation without disassembling the apparatus at all. The c-i-p is performed by setting the control unit 18, to open the valve 14 and close valve 15. When cleansing fluid is introduced through opening 7 into collecting tank 2 and the level of the cleansing fluid reaches the bottom liquid level control 11, the rotatable agitator means 6 is activated, and thus the cleansing fluid circulates in the tank 2. Control unit 18 is set so that regardless of whether cleansing fluid reaches the upper level control 12, the valves 14 and 15 will remain open and closed, respectively, thus preventing cleansing fluid from transferring to the reservoir 4.

When the apparatus has been cleaned, the (manually operated) drain valve 16 is opened, and the contaminated cleansing fluid is discharged through drain valve 16 to sewer. When the level of the cleansing fluid in the small primary tank 2 reaches the liquid level control 11, the rotatable agitator means 6 automatically stops rotating and pumping.

Then by manual switching on of the control unit 18, it is possible to restart the rotatable agitator means 6 and pump the residual amount of contaminated cleaning fluid from the collecting tank 2 through drain valve 16 to sewer.

The pump 21 for metering in preservative is not activated during the manual operation comprising cleaning-in-place.

Thus during normal operation of the system the intestinal mucosa 10 is discharged from collecting tank 2 discontinuously yet automatically from between the levels therein corresponding to the upper liquid level control 12 and the lower liquid level control 13, and, every time the mucosa level is lowered to that of lower liquid level control 13, the dosage pump 21 delivers a metered amount of preservative from the preservative reservoir 3 to the collecting tank 2. Until the preservative tank 3 is empty and has to be filled a circumstance which desirably may be indicated by means of level controlled acoustic alarm system 22, and until the storage reservoir 4 has to be discharged, usually into tank lorry 5, the apparatus works fully automatically (apart of course from morning start up, evening draining and cleaning operations).

What is claimed is:

1. An apparatus for collecting and stabilizing intestinal mucosa or a like material which comprises:
    a. a collecting tank into which the intestinal mucosa is introduced;
    b. a preservative reservoir from which preservative is intermittently metered into the collecting tank; and
    c. a storage reservoir into which preserved intestinal mucosa is intermittently transferred; said apparatus further comprising transfer means connecting said collecting tank, preservative reservoir and storage reservoir and controller means including a lower liquid level control and an upper liquid level control inside the collecting tank; said controller means further including means actuated by said upper liquid level control for initiating transfer of the intestinal mucosa from the collecting tank to the storage reservoir when the level of intestinal mucosa inside the collecting tank reaches the upper level control and for halting such transfer when the level of intestinal mucosa inside the collecting tank declines to the level of the lower level control, and for metering preservative from the preservative reservoir into the collecting tank when the liquid level of intestinal mucosa declines to the level of the lower level control through transfer of intestinal mucosa to the storage reservoir.

2. The apparatus of claim 1 including means connected to the transfer means for recirculating the intestinal mucosa out of and back into the collecting tank when the level of intestinal mucosa inside the collecting tank is between the lower and upper liquid level controls.

3. The apparatus of claim 1 including a bottom liquid level control inside the collecting tank and means associated therewith;
    (1) for initiating the recirculation of intestinal mucosa into and out of the collecting tank when the level of intestinal mucosa inside the collecting tank reaches the bottom liquid level control, and
    (2) for causing preservative to be metered from the preservative tank into the collecting tank when the level of intestinal mucosa inside the collecting tank reaches the bottom liquid level control.

4. The apparatus of claim 1 wherein the collecting tank contains a rotary agitator and a rotary intestinal mucosa discharge transfer means and a common powered shaft on which both agitator and discharge means are mounted.

5. A method for collecting and stabilizing intestinal mucosa collected intermittently employing:
    a collecting tank, a storage reservoir and a preservative reservoir which method comprises:
    a. automatically intermittently adding intestinal mucosa to the collecting tank and continuously agitating the intestinal mucosa already therein;
    b. then in response to the intestinal mucosa level in the collecting tank reaching a predetermined upper level, automatically discharging intestinal mucosa from the collecting tank to the storage reservoir and automatically discontinuing said discharge step in response to the level of intestinal mucosa in the collecting tank dropping to a predetermined lower level; and
    c. automatically metering a predetermined quantity of preservative from the preservative reservoir into the collecting tank in response to the level of intestinal mucosa in the collecting tank dropping to said predetermined lower level by discharge of intestinal mucosa therefrom.

6. The process of claim 5 wherein collection of intestinal mucosa in an otherwise empty collecting tank is commenced by introducing intestinal mucosa therein and automatically metering in a predetermined quantity of preservative.

7. The process of claim 5 wherein said intestinal mucosa is derived from slaughterhouse operations.

* * * * *